United States Patent
Gamboa

(10) Patent No.: US 7,541,781 B2
(45) Date of Patent: Jun. 2, 2009

(54) METHOD AND APPARATUS FOR CHARGING AND DISCHARGING A RECHARGEABLE BATTERY

(75) Inventor: Paul Gamboa, Chicago, IL (US)

(73) Assignee: Cobasys, LLC, Orion, MI (US)

(*) Notice: Subject to any disclaimer, the term of this patent is extended or adjusted under 35 U.S.C. 154(b) by 203 days.

(21) Appl. No.: 11/037,432

(22) Filed: Jan. 17, 2005

(65) Prior Publication Data

US 2006/0158156 A1     Jul. 20, 2006

(51) Int. Cl.
    *H02J 7/16* (2006.01)
(52) U.S. Cl. .................... 320/152; 320/141
(58) Field of Classification Search .......... 320/141, 320/145, 21, 134, 136, 135, 522, 144; 331/157, 331/176, 70, 57
See application file for complete search history.

(56) References Cited

U.S. PATENT DOCUMENTS

| | | | |
|---|---|---|---|
| 4,394,741 A | 7/1983 | Lowndes | |
| 4,558,281 A | 12/1985 | Codd et al. | |
| 4,876,513 A | 10/1989 | Brilmyer et al. | |
| 4,888,544 A * | 12/1989 | Terry et al. | 320/155 |
| 5,119,011 A | 6/1992 | Lambert | |
| 5,295,078 A | 3/1994 | Stich et al. | |
| 5,321,627 A | 6/1994 | Reher | |
| 5,412,323 A | 5/1995 | Kato et al. | |
| 5,552,999 A * | 9/1996 | Polgreen et al. | 702/63 |
| 5,623,193 A * | 4/1997 | Lang et al. | 320/136 |
| 5,710,506 A * | 1/1998 | Broell et al. | 320/145 |
| 5,801,982 A * | 9/1998 | Blodgett | 365/149 |
| 5,847,546 A * | 12/1998 | Sengupta et al. | 320/144 |
| 5,883,497 A | 3/1999 | Turnbull et al. | |
| 5,898,294 A | 4/1999 | Gold et al. | |
| 6,075,343 A | 6/2000 | Hsu et al. | |
| 6,160,380 A | 12/2000 | Tsuji et al. | |
| 6,324,339 B1 * | 11/2001 | Hudson et al. | 388/809 |
| 6,388,447 B1 | 5/2002 | Hall et al. | |
| 6,417,668 B1 | 7/2002 | Howard et al. | |
| 6,835,491 B2 * | 12/2004 | Gartstein et al. | 429/92 |
| 2002/0113594 A1 | 8/2002 | Satake | |
| 2003/0076281 A1 * | 4/2003 | Morgan et al. | 345/44 |
| 2003/0112011 A1 | 6/2003 | Guiheen et al. | |

(Continued)

FOREIGN PATENT DOCUMENTS

DE     101 47 565 A1     4/2003

(Continued)

OTHER PUBLICATIONS

PCT International Search Report dated May 12, 2006 for Application No. PCT/US2005/045997; 7 pages.

(Continued)

*Primary Examiner*—Akm E Ullah
*Assistant Examiner*—Nguyen Tran
(74) *Attorney, Agent, or Firm*—Harness, Dickey & Pierce, P.L.C.

(57) ABSTRACT

A battery protection system is provided for a rechargeable battery. The system has a switch module that selectively interrupts battery current based on a control signal, a battery voltage sensor that senses battery voltage, a battery temperature sensor that generates a battery temperature signal, and a control module that generates said control signal based on said battery temperature signal and said battery voltage.

24 Claims, 7 Drawing Sheets

U.S. PATENT DOCUMENTS

| | | | |
|---|---|---|---|
| 2003/0169049 A1 | 9/2003 | Kawaguchi et al. | |
| 2003/0231021 A1* | 12/2003 | Alwardi et al. | 324/360 |
| 2004/0257164 A1* | 12/2004 | Noguchi | 331/57 |
| 2005/0077878 A1* | 4/2005 | Carrier et al. | 320/134 |

FOREIGN PATENT DOCUMENTS

| | | |
|---|---|---|
| DE | 10147562 | 4/2003 |
| EP | 0 560 468 A | 9/1993 |
| EP | 1 085 592 A | 3/2001 |
| EP | 1 139 464 A2 | 10/2001 |
| EP | 1 220 413 A | 7/2002 |
| GB | 2086060 A | 5/1982 |
| WO | WO 94/00888 | 1/1994 |

OTHER PUBLICATIONS

Written Opinion of the International Searching Authority dated May 12, 2006 for Application No. PCT/US2005/045997, 6 pages.

Double Protection Circuit for Li-ion Battery Pack; IBM Technical Disclosure Bulletin, IBM Corp., New York; vol. 41, No. 1, Jan. 1998, pp. 93-94.

A Micropower Safety IC for Rechargeable Lithium Batteries; Stockstad T. et al; Custom Integrated Circuits Conference, May 1996; pp. 127-130.

Micro Power Protection Chip for Rechargeable Lithium-ion Batteries; G. Smith, Custom Integrated Circuits Conference; May 1996; pp. 131-134.

International Search Report dated Sep. 12, 2005 for Application No. PCT/US2005/011761; 6 pages.

\* cited by examiner

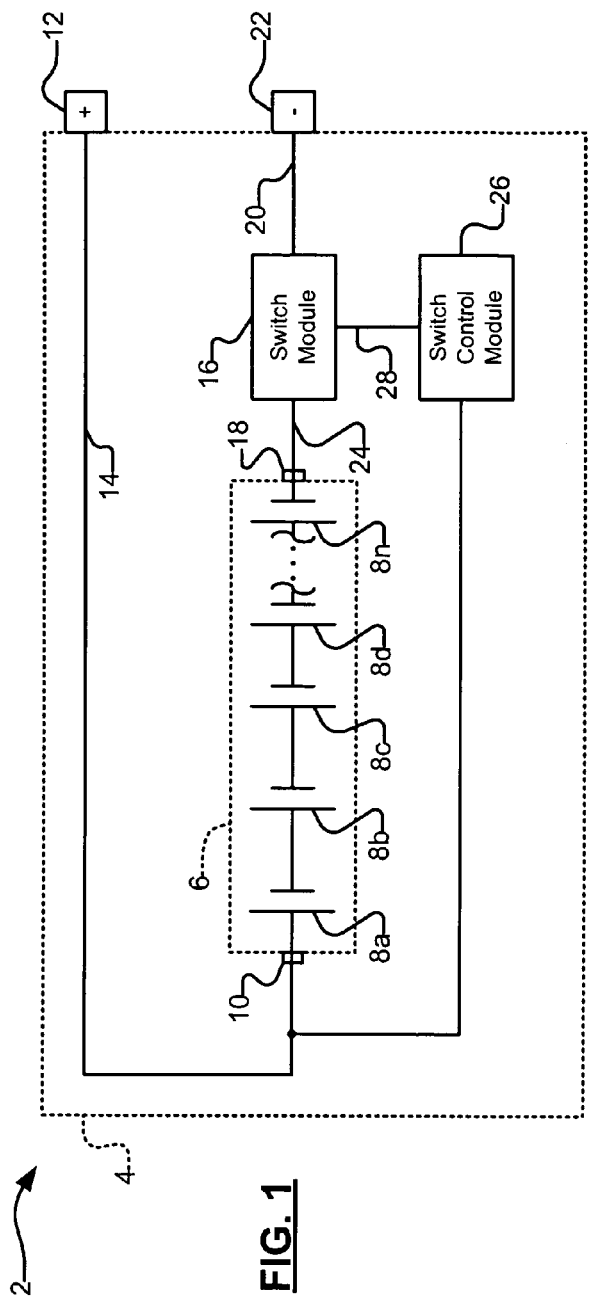
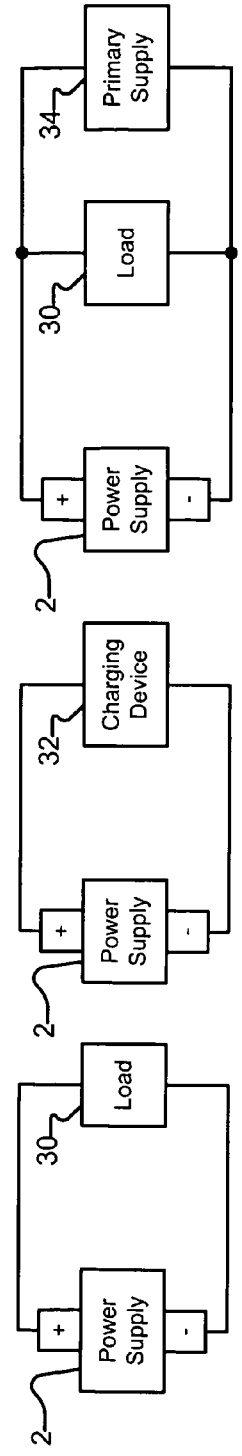
FIG. 1
FIG. 2A
FIG. 2B
FIG. 2C

US 7,541,781 B2

METHOD AND APPARATUS FOR CHARGING AND DISCHARGING A RECHARGEABLE BATTERY

FIELD OF THE INVENTION

The present invention relates generally to battery systems, and more particularly to a battery charger for battery systems.

BACKGROUND OF THE INVENTION

Rechargeable batteries, particularly nickel-metal hydride (NiMH) batteries, are useful in many types of applications. For example, the batteries may be used as a backup power supply for stationary applications such as cellular towers. The batteries provide backup power during a main grid outage. In such an application, it is desirable that the batteries are connected to a battery charging circuit that maintains the state of charge of the batteries. Under certain circumstances, charging NiMH batteries may cause the batteries to overheat, which may damage the batteries or other components.

SUMMARY OF THE INVENTION

A battery protection system is provided for a rechargeable battery. The system has a switch module that selectively interrupts battery current based on a control signal, a battery voltage sensor that senses battery voltage, a battery temperature sensor that generates a battery temperature signal, and a control module that generates the control signal based on the battery temperature signal and the battery voltage.

A battery protection circuit is also provided. The circuit has a switch module that selectively interrupts battery current based on a control signal. A first oscillator module generates a first signal having a first period and a temperature dependent oscillator module generates a second signal having a second period. A duty cycle generator receives the first signal and the second signal, and generates the control signal. The control signal is pulse-width modulated at the first period with a duty cycle established by the second period.

A method for protecting a rechargeable battery is provided. The method includes monitoring a battery temperature and monitoring a battery voltage, and selectively interrupting current flow to the battery based on the battery temperature and the battery voltage.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a block diagram and electrical schematic of a rechargeable power supply;

FIG. 2A is a functional block diagram of the power supply of FIG. 1 being used as a primary power supply for a load;

FIG. 2B is a functional block diagram of the power supply of FIG. 1 being recharged;

FIG. 2C is a functional block diagram of the power supply of FIG. 1 being used as a backup power supply in combination with a primary power supply;

DETAILED DESCRIPTION OF THE PREFERRED EMBODIMENTS

Figure 3:
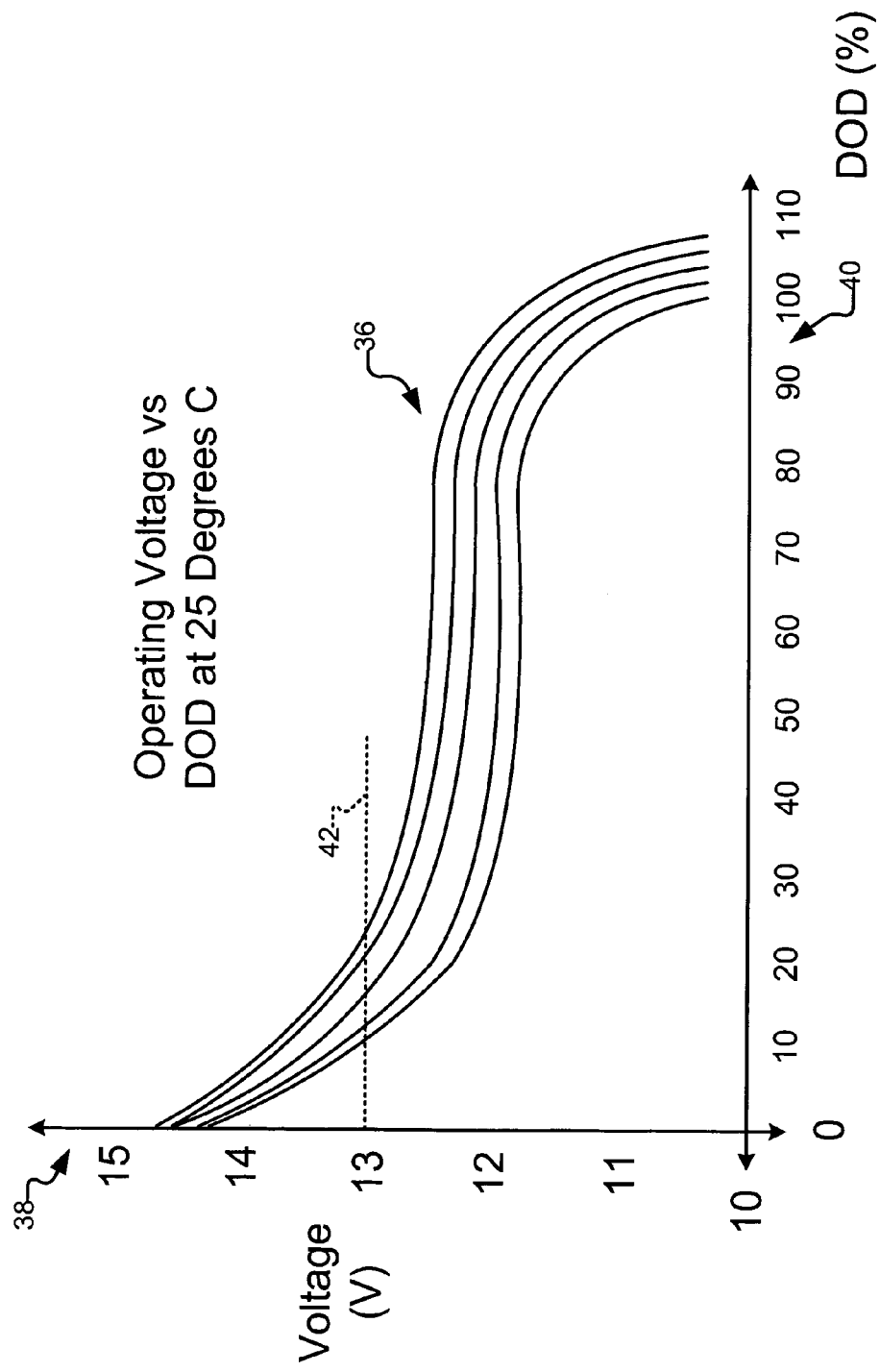
FIG. 3 is a graph of operating voltage as a function of depth of discharge (DOD) at 25° C.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group), and memory that execute one or more software or firmware programs, a combinational logic circuit, and/or other suitable components that provide the described functionality. For purposes of clarity, the same reference numerals will be used to identify similar elements.

Referring now to FIG. 1, a block diagram and electrical schematic of a rechargeable power supply 2 is shown. The power supply 2 has a housing 4 containing a battery 6. The battery 6 has a number of individual cells 8a, 8b, ..., 8n, collectively referred to as cells 8. In some implementations, the cells 8 may be nickel-metal hydride (NiMH) cells, although other types of batteries may be used. A positive battery terminal 10 is connected to a power supply positive terminal 12 by a positive bus 14. A switch module 16 selectively connects a negative battery terminal 18 to a negative bus 20. The negative bus 20 is connected to a power supply negative terminal 22. The positive and negative power supply terminals 12, 22 are preferably positioned along an end face of the housing 4, thereby facilitating electrical interconnection of a plurality of the rechargeable power supplies 2. An intermediate connection 24 connects the negative battery terminal 18 to the switch module 16. A switch control module 26 generates a switch control signal 28 based on battery voltage and temperature as will be described below. A resettable circuit breaker or fuse (not shown) may also be placed in series with the battery 6.

Referring now to FIG. 2A, the power supply 2 is shown connected to a load 30. The battery 6 of the power supply 2 provides current to the load 30 when the switch module 16 is closed. The switch control module 26 will open the switch module 16 via the switch control signal 28 if the battery temperature is above a predetermined threshold.

Referring now to FIG. 2B, the power supply 2 is shown connected to a charging device 32. The charging device 32 provides power to recharge the battery 6 of the power supply 2. The switch control module 26 monitors the voltage and the temperature of the battery 6, and controls charging of the battery 6 in accordance with a method described later.

Referring now to FIG. 2C, a primary supply 34 is connected across the load 30 and the power supply 2. The primary supply 34 provides power to power the load 30 and/or to charge the battery 6 in the power supply 2. If the primary supply 34 stops providing current, such as may happen during a power outage, the power supply 2 continues providing current to the load 30 until the primary supply 34 is restored. The amount of time that the power supply 2 can provide power is determined by several factors including the capacity (amphours) of the battery 6, the state of charge (SOC) of the battery 6 at the time the primary supply 34 failed, the temperature of the battery 6, and the current drawn by the load 30.

Referring now to FIG. 3, a family of curves 36 of a NiMH battery 6 is shown. A y-axis 38 indicates battery voltage and an x-axis 40 indicates degree of discharge (DOD) of each battery 6. The family of curves 36 provides an indication of the voltage vs DOD at 25 deg. C. It can be seen that the battery voltage increases rapidly as DOD decreases. A cutoff voltage, or $V_{CUTOFF}$, 42 is selected to provide an indication that the battery 6 is fully charged.

Figure 4:
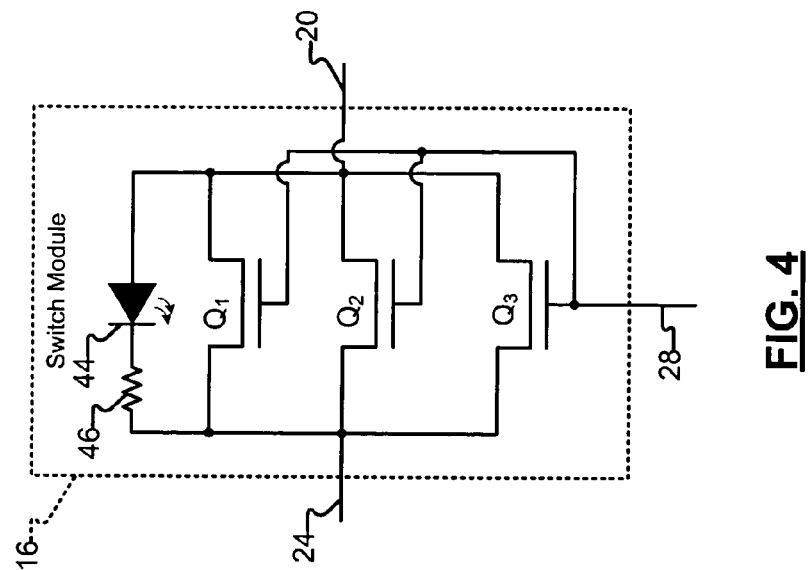
FIG. 4 is an electrical schematic of an exemplary switch module.

Referring now to FIG. 4, an exemplary switch module 16 is shown. The switch module 16 may be implemented using any combination of electromechanical relays, transistors, electronic and integrated circuits, and/or any material having very high and very low states of resistance. The depicted switch module 16 includes NMOS transistors $Q_1$, $Q_2$, and $Q_3$. A source of each transistor $Q_{1-3}$ is connected to the negative bus 20. A drain of each transistor $Q_{1-3}$ is connected to the intermediate connection 24. A gate of each transistor $Q_{1-3}$ is connected to the switch control signal 28. The switch module 16 may also include an indicator, such as an LED 44 with a current limiting resistor 46, to indicate whether the switch module is open or closed while the battery 6 is charging.

Figure 5:
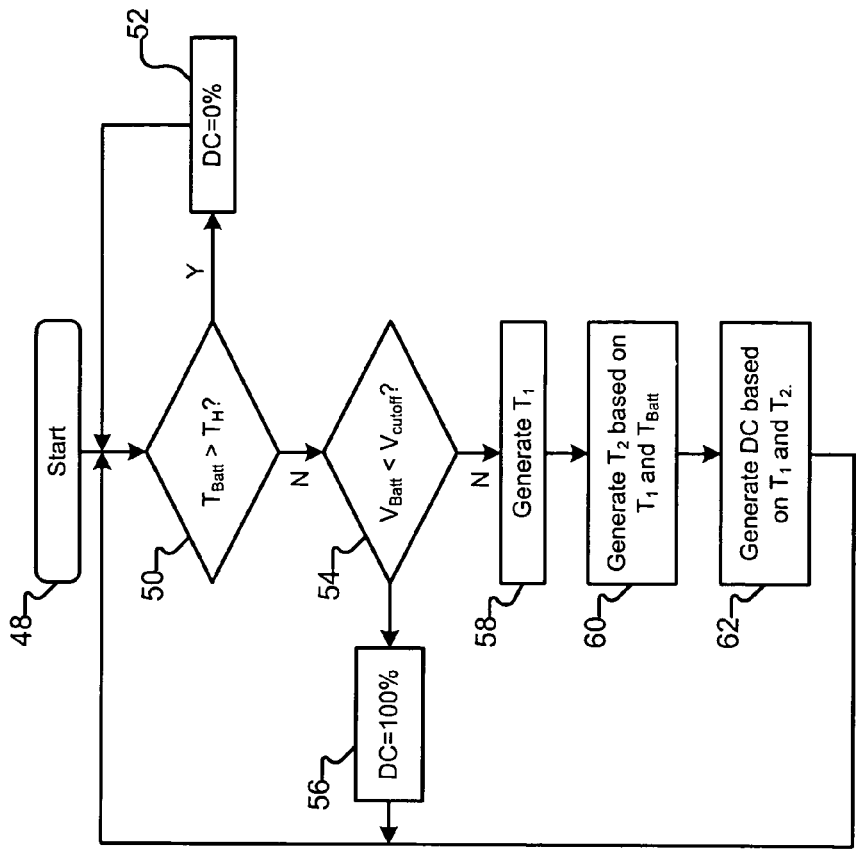
FIG. 5 is a flowchart illustrating steps of a method for charging rechargeable batteries.

Referring now to FIG. 5, steps of a method for generating a switch control signal 28 are shown. In the described embodiment, the switch control signal is a PWM signal having a duty cycle between 0 and 100%, however it is understood that other types of control signals and/or other duty cycles may be used to control the switch module 16.

The method begins in step 48. In step 50, control determines whether temperature $T_{BATT}$ of the battery 6 is above a predetermined temperature threshold $T_H$. If the determination made in step 46 returns a true result, then control proceeds to step 52 and opens the switch module 16 by setting the duty cycle (DC) to zero percent. In step 50, if $T_{BATT}$ is below $T_H$ then control proceeds to decision block 54 and determines whether the voltage $V_{BATT}$ of the battery 6 is less than the predetermined battery voltage threshold $V_{CUTOFF}$. If the determination made in step 54 returns a true result, then control proceeds to step 56. In step 56, control closes the switch module 16 by setting the duty cycle to one hundred percent. Returning to step 54, if $V_{BATT}$ is equal to or greater than the predetermined battery voltage threshold $V_{CUTOFF}$, then control proceeds to step 58 and establishes a first time period $T_1$. Control then proceeds to step 60 and generates a second time period $T_2$, which is temperature compensated by $T_{BATT}$. The time period $T_2$ decreases as $T_{BATT}$ increases. In step 62, control generates a switch control signal 28 having a DC that is derived from $T_1$ and $T_2$.

Figure 6:
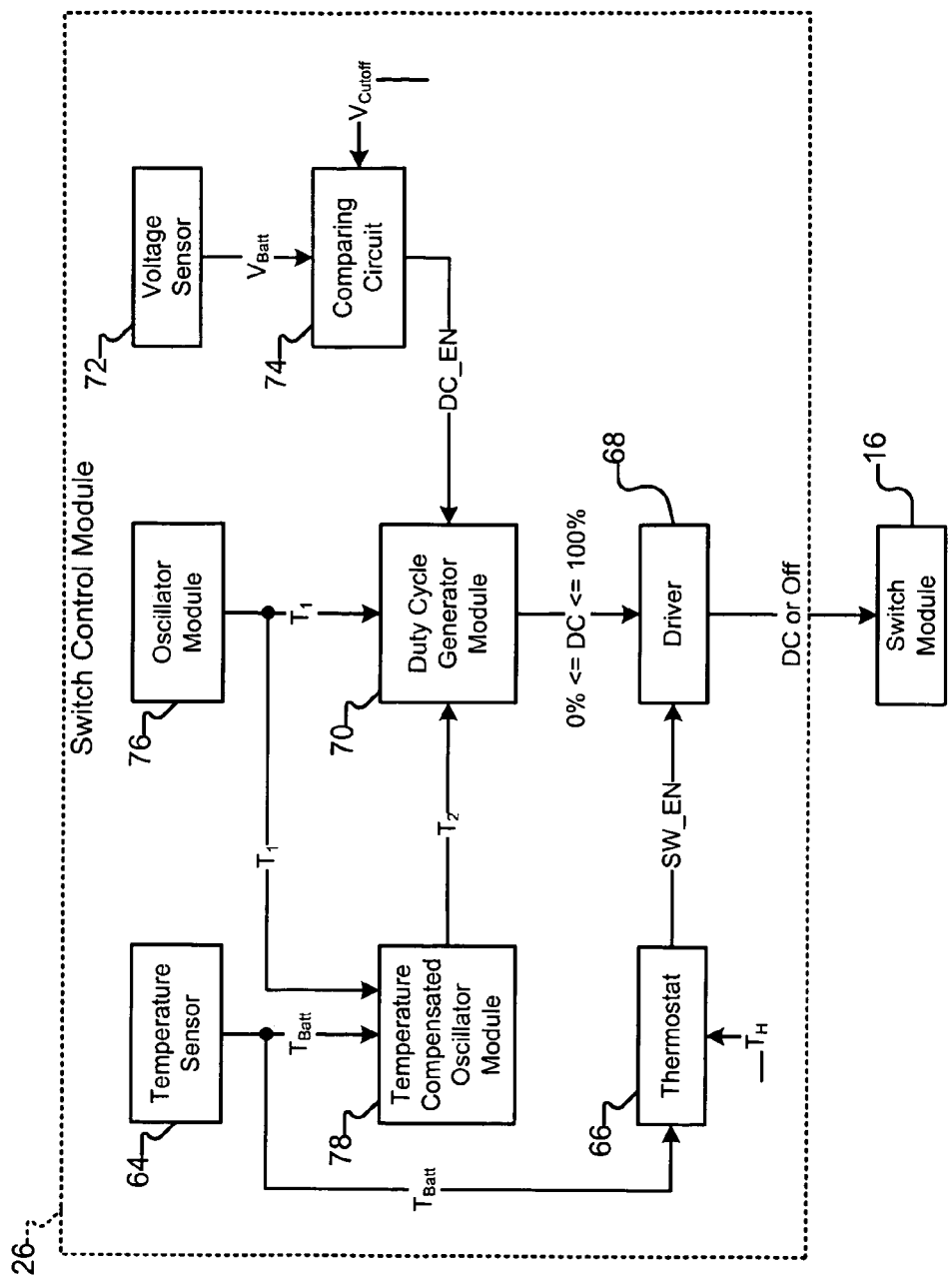
FIG. 6 is a functional block diagram of a battery charger according to some implementations of the present invention.

Referring now to FIG. 6, a functional block diagram of a switch control module 26 is shown. A temperature sensor 64 indicates the battery temperature $T_{BATT}$. A thermostat 66 compares $T_{BATT}$ to $T_H$ and provides a switch enable signal SW_EN to a driver 68. When $T_{BATT}$ is greater than $T_H$, the thermostat 66 opens the switch module 16 by turning off the driver 68.

When $T_{BATT}$ is less than or equal to $T_H$, the driver 68 produces a PWM signal having a duty cycle that is set by a duty cycle (DC) generator 70. The duty cycle generator 70 produces a 100% duty cycle signal when a voltage sensor 72 and a comparator 74 determine that the battery voltage $V_{BATT}$ is less than the cutoff voltage $V_{CUTOFF}$. When the voltage sensor 72 and the comparator 74 determine that the battery voltage $V_{BATT}$ is greater than the cutoff voltage $V_{CUTOFF}$, the duty cycle generator 70 produces a duty cycle signal based on periods $T_1$ and $T_2$. The period $T_1$ is derived from an oscillator module 76 and period $T_2$ has a variable value generated by a temperature compensated oscillator 78. The temperature compensated oscillator 78 is synchronized with the period $T_1$. The period $T_2$ varies as a function of $T_{BATT}$. In some implementations, the period $T_2$ of the temperature compensated oscillator 78 decreases as $T_{BATT}$ increases.

Figure 7:
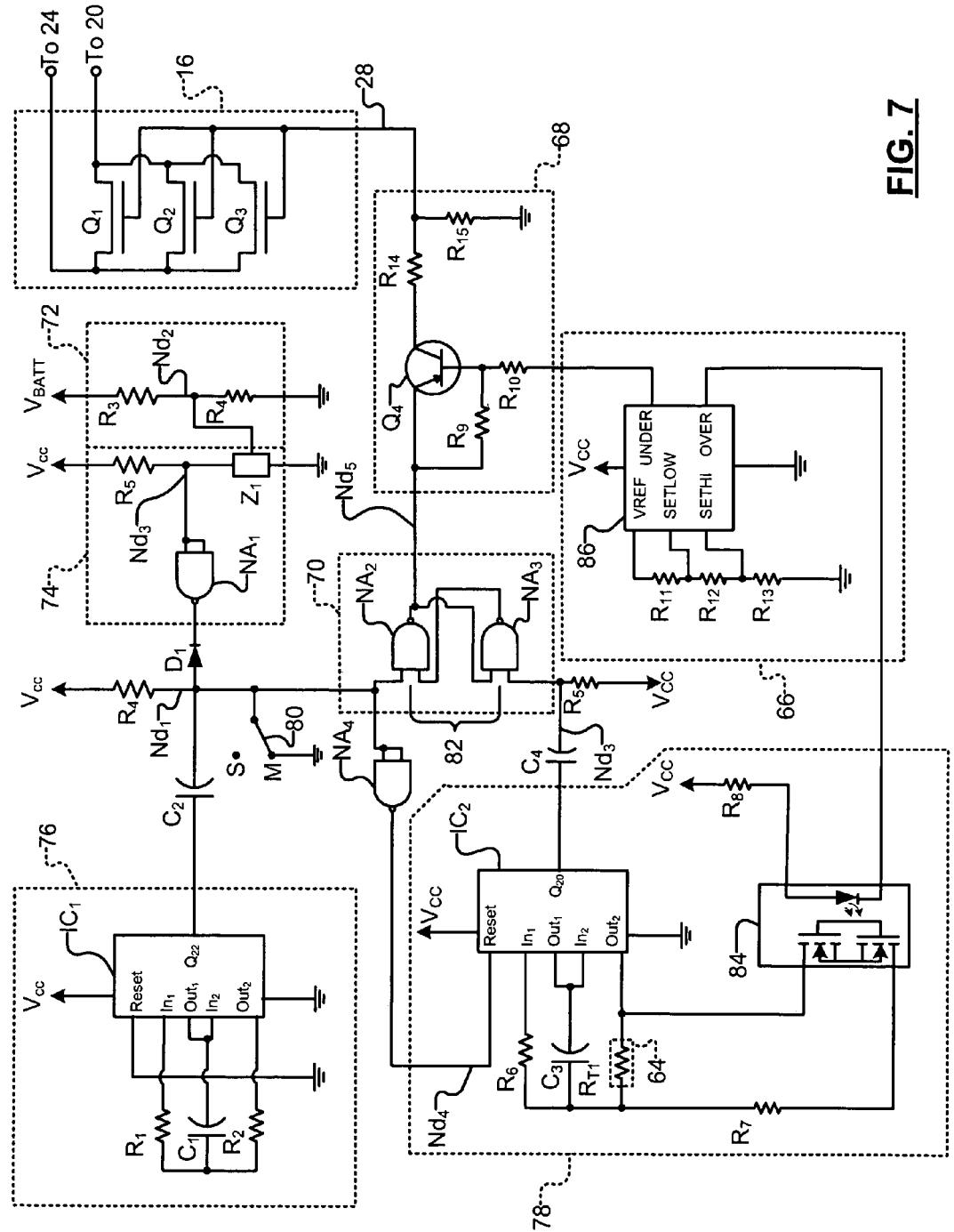
FIG. 7 is an electrical schematic of one implementation of the battery charger of FIG. 6.
Figure 7A:
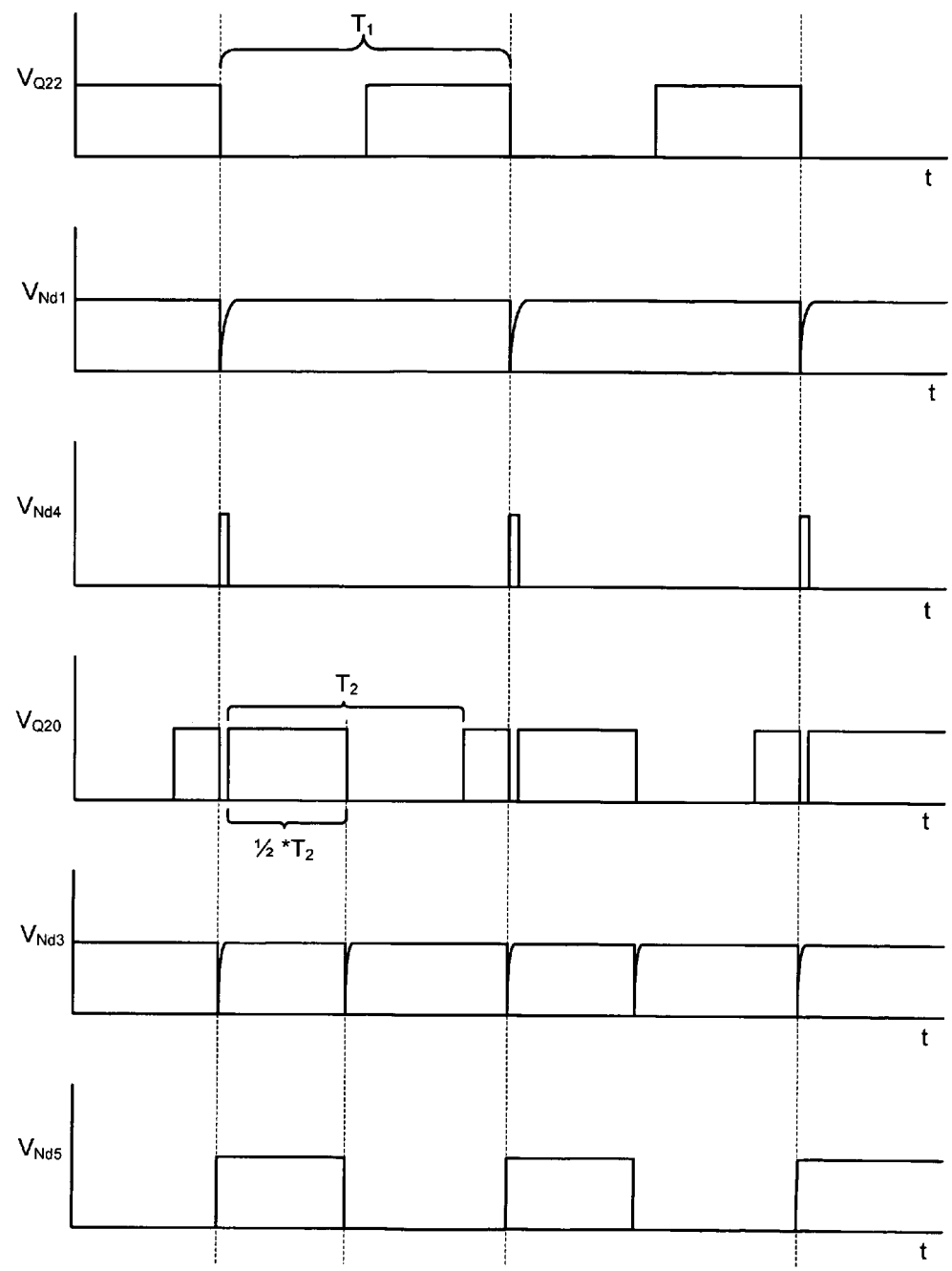
FIG. 7A depicts waveforms of the battery charger of FIG. 7.

Referring now to FIGS. 7 and 7A, one exemplary circuit that implements the switch control module 26 of FIG. 6 is described. The battery voltage $V_{BATT}$ is taken directly from the positive battery terminal 10 and ground is connected to the negative battery terminal 18. A power supply voltage $V_{CC}$ is derived by passing $V_{BATT}$ through a low-pass RC filter (not shown).

The oscillator module 76 is implemented with an integrated circuit $IC_1$. The integrated circuit $IC_1$ is a 24-stage frequency divider, such as an MC14521B. One terminal each of a resistor $R_1$, a resistor $R_2$, and a capacitor $C_1$, are connected together. The other end of the resistor $R_1$ is connected to an $IN_1$ input of the integrated circuit $IC_1$. The other end of the resistor $R_2$ is connected to an $OUT_2$ output of the integrated circuit $IC_1$. An input $IN_2$ and an output $OUT_1$ of the integrated circuit $IC_1$ are connected to the other end of the capacitor $C_1$. This configuration of the resistors $R_1$ and $R_2$, the capacitor $C_1$, and the integrated circuit $IC_1$, produces a square wave at an output $Q_{22}$ of the integrated circuit $IC_1$. The square wave is shown in FIG. 7A at $V_{Q22}$. The square wave has a fixed period $T_1$ that is established by the resistor $R_2$ and the capacitor $C_1$. The pulse-width of the square wave $V_{Q22}$ is $½*T_1$. The square wave is output through a capacitor $C_2$ to a node $Nd_1$. The node $Nd_1$ is pulled up to $V_{cc}$ through a resistor $R_4$. The node $Nd_1$ is an input to a duty cycle generator 70 and has a waveform that is dependent on the outputs of the comparator 74, a master/slave switch 80, and the oscillator module 76. The waveform of node $Nd_1$ will be described after the operations of the connected circuit blocks are described.

The voltage sensor 72 includes a voltage divider formed of an upper resistor $R_3$ and a lower resistor $R_4$. One end of the upper resistor $R_3$ is connect to $V_{BATT}$. One end of the lower resistor $R_4$ is connected to ground. The other end of the upper resistor $R_3$ and the other end of the lower resistor $R_4$ are connected together to form node $Nd_2$, which is the center tap of the voltage divider. The node $Nd_2$ provides a scaled battery voltage signal.

The comparator 74 has a NAND gate $NA_1$ with an open collector output. The NAND gate $NA_1$ is configured as an inverter. An input to the inverter is a node $Nd_3$ located at a connection of one end of a resistor $R_5$ and a cathode of a 3-terminal voltage regulator $Z_1$. Examples of devices that may be used to implement the voltage regulator $Z_1$ include a TL431/TL431A/TL431B series of programmable voltage references available from Linfinity Microelectronics, Inc. The other terminal of the resistor $R_5$ is connected to $V_{CC}$. An anode of the voltage regulator $Z_1$ is connected to ground. A reference pin of the voltage regulator $Z_1$ is connected to the node $Nd_2$. A voltage at the node $Nd_3$ is low when the voltage regulator $Z_1$ is conducting, which occurs when $V_{BATT}$ is greater than or equal to $V_{CUTOFF}$. A conduction point of the voltage regulator $Z_1$ is established by the resistors $R_3$ and $R_4$, which should have resistances selected such that voltage at the node $Nd_2$ causes the voltage regulator $Z_1$ to conduct when $V_{BATT}$ is greater than or equal to $V_{CUTOFF}$. An output of the NAND gate $NA_1$ connects to a cathode of a diode $D_1$. An anode of the diode $D_1$ connects to the node $Nd_1$.

A waveform at the node $Nd_1$ will now be described. A common pole of the master/slave switch 80 is connected to the node $Nd_1$. If the switch 80 is in the master position M and closing a path to ground, then the switch 80 will hold the node $Nd_1$ at ground. If the switch 80 is in the slave position S and $V_{BATT}$ is less than $V_{CUTOFF}$, then the diode $D_1$ will be forward biased by the comparator 74 and the voltage of the node $Nd_1$ will be held low. If the switch 80 is in the slave position and $V_{BATT}$ is greater than or equal to $V_{CUTOFF}$, then the comparator 74 will prevent the diode $D_1$ from conducting. The voltage of the node $Nd_1$ will then pulse low with each falling edge from the output $Q_{22}$ of the integrated circuit $IC_1$. The low pulses have a period $T_1$ as shown in FIG. 7A at $V_{Nd1}$.

The node $Nd_1$ is an input to the duty cycle generator 70. The duty cycle generator 70 is formed from a set-reset (SR) flip-flop 82 fabricated of NAND gates $NA_2$ and $NA_3$. An output of the NAND gate $NA_2$ is connected to an input of the NAND gate $NA_3$. An output of the NAND gate $NA_3$ is connected to an input of the NAND gate $NA_2$. A remaining input of the NAND gate $NA_2$ operates as the set input of the SR flip-flop and is connected to the node $Nd_1$. A remaining input of the NAND gate $NA_3$ operates as the reset input of the SR flip-flop and is connected to the node $Nd_3$. An output of the duty cycle generator 70 is taken from the output of $NA_2$. The output voltage of the duty cycle generator 70 is high after the node $Nd_1$ is pulsed low, and low after the node $Nd_3$ is pulsed low. The output of the duty cycle generator 70 will remain high when either the switch 80 or the comparator 74 holds the node Nd1 low.

The temperature compensated oscillator 78 is formed around an integrated circuit $IC_2$, which is a 24-stage frequency divider such as an MC14521B. An output of a NAND gate $NA_4$ provides a node $Nd_4$. A waveform at the node $Nd_4$ is a logical complement of the waveform at the node $Nd_1$ as is shown in FIG. 7A at $V_{Nd4}$. A Reset input of the integrated circuit $IC_2$ is connected to the node $Nd_4$. As is shown in FIG. 7A at $V_{Q20}$, an output $Q_{20}$ of the integrated circuit $IC_2$ is low while the Reset input of the integrated circuit $IC_2$ is held high by the node $Nd_4$.

One end each of a resistor $R_6$, a thermistor $R_{T1}$, and a capacitor $C_3$, are connected together. A remaining end of the resistor $R_6$ is connected to an $In_1$ input of the integrated circuit $IC_2$. A remaining end of the capacitor $C_3$ is connected to an output $Out_1$ and to an input $In_2$ of the integrated circuit $IC_2$. A remaining end of the thermistor $R_{T1}$ is connected to an output $Out_2$ of the integrated circuit $IC_2$. The resistance of thermistor $R_{T1}$ decreases as its temperature increases. The thermistor $R_{T1}$ is preferably positioned in proximity to a battery 6 (not shown) that is connected to the switch module 16. An optocoupler 84 selectively couples a resistor $R_7$ in parallel with the thermistor $R_{T1}$. The optocoupler 84 has an internal LED with an anode pulled up to $V_{CC}$ by a resistor $R_8$. A cathode of the LED is connected to an output of the thermostat 66.

The output $Q_{20}$ of integrated circuit $IC_2$ generates a pulse train having a period $T_2$ and a pulsewidth of $½*T_2$ as is shown in FIG. 7A at $V_{Q20}$. The period $T_2$ decreases as the temperature of $R_{T1}$ increases. The period of $T_2$ also decreases when $R_7$ is switched in parallel with $R_{T1}$. The output $Q_{20}$ of the integrated circuit $IC_2$ is connected to a capacitor $C_4$. An opposite end of the capacitor $C_4$ is connected to the node $Nd_3$, which is the reset input of the duty cycle generator 70. Each time the output $Q_{20}$ of the integrated circuit $IC_2$ transitions from high to low, a low-going pulse appears at the node $Nd_3$ as is shown in FIG. 7A at $V_{Nd3}$. Each low-going pulse causes the output of the duty cycle generator 70 to go low. When the node $N_{d1}$ is carrying the pulses initiated by the output $Q_{22}$ of the integrated circuit $IC_1$, the output signal from the duty cycle generator 70 is a PWM signal. The PWM signal has a period $T_1$ established by the oscillator module 76 and a duty cycle established by the temperature compensated oscillator 78. An output signal of the duty cycle generator 70 operating in such a situation appears in FIG. 7A at $V_{Nd5}$. The output signal may be used as the control signal 28 as described later.

The output signal from the duty cycle generator 70 is input to the driver 68. The driver 68 has a transistor $Q_4$. A resistor $R_9$ is connected between a base and emitter of the transistor $Q_4$. A resistor $R_{10}$ is in series with the base of the transistor $Q_4$. One end of a resistor $R_{14}$ is connected to the collector of the transistor $Q_4$. The other end of the resistor $R_{14}$ provides the switch control signal 28 and is pulled down to ground through a resistor $R_{15}$. The duty cycle of the switch control signal 28 is zero percent when the thermostat 66 turns off the transistor $Q_4$. The duty cycle of the switch control signal is greater than zero percent when the transistor $Q_4$ is amplifying the signal from the node $Nd_5$.

The thermostat 66 has a temperature controller 86. An example of a device suitable for use as the temperature controller 86 is an Analog Devices part number TMP01FS. A resistor $R_{11}$ is connected between a VREF output and a SETLOW input of the temperature controller 86. A resistor $R_{12}$ is connected between the SETLOW input and a SETHI input of the temperature controller 86. A resistor $R_{13}$ is connected between the SETHI input of the temperature controller 86 and ground. The temperature controller 86 has an output UNDER that is connected to the driver 68. The output UNDER of the temperature controller 86 turns the transistor $Q_4$ on when the battery temperature $T_{BATT}$ is below a predetermined threshold. The thermostat 66 is therefore preferably positioned proximate the battery 6 that is connected to the switch module 16. The junction of the resistors $R_{11}$ and $R_{12}$ provides a voltage corresponding to a predetermined low battery temperature $T_L$ threshold. The junction between the resistors $R_{12}$ and $R_{13}$ provides a voltage corresponding to a predetermined high battery temperature $T_H$ threshold.

The OVER and UNDER outputs of the temperature controller 86 are active low. The output UNDER is low when the battery temperature $T_{BATT}$ is less than the predetermined high battery temperature $T_H$. The output OVER is low when the battery temperature $T_{BATT}$ is greater than the predetermined low battery temperature $T_L$.

The output OVER is connected to the cathode of the LED in the optoisolator 84. The LED is turned on when the output OVER goes low, thereby selectively connecting resistor $R_7$ in parallel with $R_{T1}$. The thermostat 66 thereby provides a mechanism for selecting a range of period $T_2$ from two period ranges. The output UNDER drives the base of $Q_4$ and turns $Q_4$ off when the battery temperature $T_{BATT}$ is greater than the high battery temperature $T_H$. In the depicted embodiment, the high battery temperature $T_H$ is selected to be 50 deg C. and the low battery temperature $T_L$ is selected to be 40 deg C. Other values may be used as needed to prevent the battery 6 from overheating while it is being charged.

Figure 8:
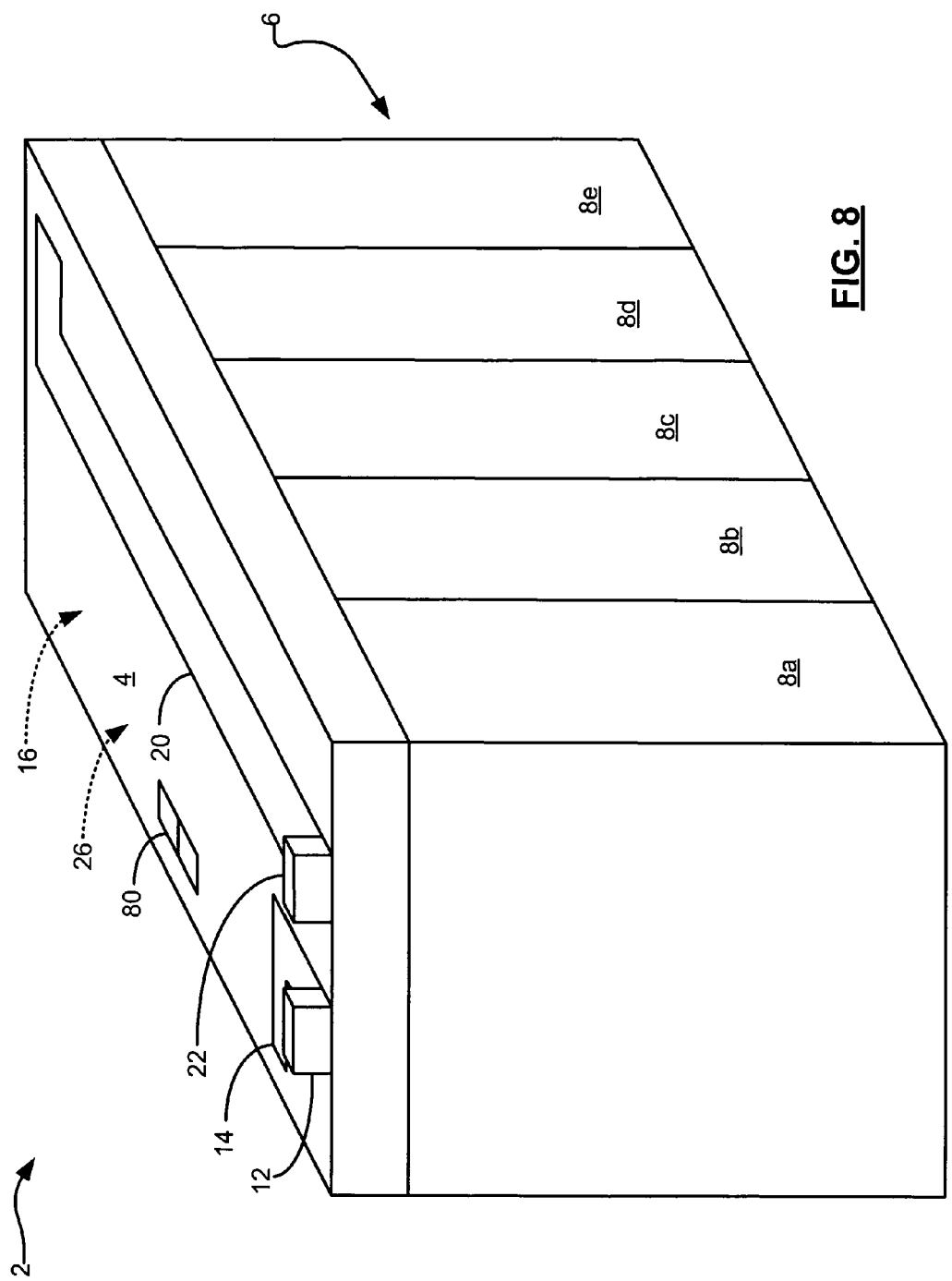
FIG. 8 is a perspective view of a rechargeable power supply.

Referring now to FIG. 8, an exterior perspective view of a rechargeable power supply 2 is shown. The power supply 2 has a battery 6 with a number of prismatic cells 8a-e. A housing 4 contains the battery 6, a switch module 16, and a control module 26. In one of many embodiments, the master/slave switch 80 is accessible at from an exterior of the housing 4. The power supply positive terminal 12 and the negative terminal 22 are positioned on the housing 4.

A plurality of the power supplies 2 may be coupled in series with one power supply 2 having the switch 80 set to the master position, and the remaining power supplies 2 having switches 80 set to slave. Such a series configuration of power supplies 2 allows the switch control module 26 of the power supply 2 set to master to control the charging and discharging of the batteries 6 in the remaining power supplies 2 that have switches 80 set to the slave position.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A battery protection system for a rechargeable battery, comprising:
    a switch module that selectively interrupts battery current from the rechargeable battery to a load based on a control signal;
    a battery voltage sensor that senses battery voltage;
    a battery temperature sensor that generates a battery temperature signal; and
    a control module that generates said control signal based on said battery temperature signal and said battery voltage, wherein said control signal is a pulse-width modulated (PWM) waveform having a period that is set by a first signal and a duty cycle that is set by a second signal that varies based on said battery temperature signal and said first signal and wherein said duty cycle is zero percent when said battery temperature exceeds a first predetermined temperature.

2. The battery protection system of claim 1 wherein said duty cycle is one hundred percent when said battery temperature is less than said first predetermined temperature and said battery voltage is less than a predetermined voltage.

3. The battery protection system of claim 2 wherein said duty cycle is between zero percent and one hundred percent when said battery temperature is less than said first predetermined temperature and said battery voltage is greater than said predetermined voltage.

4. The battery protection system of claim 1 wherein said control module further comprises:
    a first oscillator module that generates said first signal having a first period;
    a temperature dependent oscillator module that generates said second signal having a second period that varies based on said battery temperature signal; and
    a duty cycle generator module that generates said PWM signal from said first signal and said second signal.

5. The battery protection system of claim 4 wherein said temperature dependent oscillator module has at least two ranges of periods, said second period being within one of said at least two ranges of periods.

6. The battery protection system of claim 5 further comprising a temperature controller for selecting which of said at least two period ranges is used by said temperature dependent oscillator.

7. A self-protecting rechargeable power supply comprising the battery protection system of claim 1 and further comprising:
    said rechargeable battery; and
    a housing containing said rechargeable battery, battery voltage sensor, battery temperature sensor, control module, and switch module.

8. A battery protection circuit comprising:
    a switch module that selectively interrupts battery current based on a control signal;
    a first oscillator module that generates a first signal having a first period;
    a temperature dependent oscillator module that generates a second signal having a second period; and
    a duty cycle generator that receives said first signal and said second signal and generates said control signal, wherein said control signal is pulse-width modulated at said first period with a duty cycle established by said second period wherein said temperature dependent oscillator module receives a reset signal that is based on said first signal and generates said second signal based on said reset signal.

9. The battery protection circuit of claim 8 wherein said temperature dependent oscillator is dependent on a battery temperature.

10. The battery protection circuit of claim 8 wherein said duty cycle generator further includes a flip-flop having a set input, a reset input, and an output, said first signal being connected to said set input and said second signal being connected to said reset input, and wherein said output performs the pulse-width modulation of said control signal.

11. The battery protection circuit of claim 8 further comprising a thermostat module, said thermostat module controlling said control signal in accordance with a battery temperature.

12. The battery protection circuit of claim 8 further comprising a comparator module that enables and disables said first signal based on a battery voltage.

13. A self-protecting rechargeable power supply comprising the battery protection system of claim 8 and further comprising:
    a rechargeable battery; and
    a housing containing said rechargeable battery, said first oscillator, said temperature dependent oscillator, said duty cycle generator, and said switch module.

14. The self-protecting rechargeable power supply of claim 13 further comprising positive and negative electrical terminals for making electrical connections, said positive and negative electrical terminals positioned on an end face of said housing.

15. A method for protecting a rechargeable battery, comprising:
    monitoring a battery temperature;
    monitoring a battery voltage;
    pulse width modulating the current flow from the battery at a period that is set by a first signal and at a duty cycle that is set by a second signal that varies based on said battery temperature and said battery voltage and said first signal; and
    setting said duty cycle to turn off the current flow when said battery temperature exceeds a first predetermined temperature.

16. The method of claim 15 further comprising:
    setting said duty cycle to completely turn on the current flow when said battery temperature is less than a first predetermined temperature and when said battery voltage is less than a predetermined voltage.

17. The method of claim 16 further comprising:
    setting said duty cycle to between zero percent and one hundred percent when said battery temperature is less than said first predetermined temperature and said battery voltage is greater than said predetermined voltage.

18. The method of claim 15 further comprising:
generating said first signal having a first period;
generating said second signal having a second period that varies based on said battery temperature; and
generating said duty cycle based on said first signal and said second signal.

19. The method of claim 15 further comprising:
selecting said second period from at least two ranges of periods.

20. The method of claim 15 further comprising:
providing a housing containing the rechargeable battery.

21. The battery protection system of claim 1 wherein said switch module is in series with the rechargeable battery relative to load terminals of said load.

22. The battery protection system of claim 1 wherein said switch module and the rechargeable battery are in series between power supply terminals that are in communication with load terminals of the load.

23. The battery protection system of claim 1 wherein the rechargeable battery is in series between the switch module and said load.

24. A battery protection circuit comprising:
a switch module that selectively interrupts battery current based on a control signal;
a first oscillator module that generates a first signal having a first period;
a temperature dependent oscillator module that generates a second signal having a second period; and
a duty cycle generator that receives said first signal and said second signal and generates said control signal, wherein said control signal is pulse-width modulated at said first period with a duty cycle established by said second period, wherein said temperature dependent oscillator module generates said second signal based on said first signal.

* * * * *